(12) United States Patent
Ralston

(10) Patent No.: US 8,205,399 B2
(45) Date of Patent: Jun. 26, 2012

(54) PORTABLE DWELLING

(76) Inventor: Susan Nichols Ralston, Trumbull, CT (US)

( * ) Notice: Subject to any disclaimer, the term of this patent is extended or adjusted under 35 U.S.C. 154(b) by 0 days.

(21) Appl. No.: 12/741,336

(22) PCT Filed: Nov. 3, 2008

(86) PCT No.: PCT/US2008/082252
§ 371 (c)(1),
(2), (4) Date: May 4, 2010

(87) PCT Pub. No.: WO2009/061700
PCT Pub. Date: May 14, 2009

(65) Prior Publication Data
US 2011/0107690 A1 May 12, 2011

Related U.S. Application Data

(60) Provisional application No. 60/985,425, filed on Nov. 5, 2007.

(51) Int. Cl.
*E04B 1/34* (2006.01)
*E04H 1/12* (2006.01)
(52) U.S. Cl. ........................................ 52/143; 280/79.2
(58) Field of Classification Search .................... 52/143, 52/79.5, 64, 234; 280/79.2; 269/156, 168
See application file for complete search history.

(56) References Cited

U.S. PATENT DOCUMENTS

| 3,732,649 | A * | 5/1973 | Mehran | 52/169.3 |
| 4,600,254 | A * | 7/1986 | Whalen | 312/323 |
| 7,017,975 | B2 * | 3/2006 | Parmer | 296/157 |
| 7,487,977 | B2 * | 2/2009 | Johnson | 280/47.34 |
| 7,568,311 | B2 * | 8/2009 | Shivak et al. | 49/409 |
| 2004/0177571 | A1 * | 9/2004 | Johnson | 52/143 |
| 2005/0006861 | A1 * | 1/2005 | Dubois et al. | 280/33.998 |
| 2005/0067802 | A1 * | 3/2005 | Lambert | 280/47.35 |
| 2006/0055193 | A1 * | 3/2006 | Colborne | 296/24.3 |
| 2011/0186458 | A1 * | 8/2011 | Schiessl | 206/457 |

FOREIGN PATENT DOCUMENTS

JP 2002129761 A 5/2002
(Continued)

OTHER PUBLICATIONS

English Abstract for KR19910008237; Publication date: May 30, 1991; 1 page.

(Continued)

*Primary Examiner* — David Dunn
*Assistant Examiner* — Paola Agudelo
(74) *Attorney, Agent, or Firm* — Cantor Colburn LLP

(57) ABSTRACT

A portable dwelling for use on the ground is disclosed having an enclosure with an interior space so dimensioned to receive an adult human being in a reclined or laying position and in an upright sitting position within the interior space. The enclosure has a plurality of surfaces between the interior space and an exterior space capable of maintaining dryness of the interior space in the event of a rainfall. Wheels are attached to the enclosure to facilitate movement of the enclosure along the ground. The enclosure has a mass capable of being moved along the ground via the wheels by the single adult human being, and has an exterior profile so dimensioned to allow the enclosure to be moved along a sidewalk of a city without completely obstructing a navigable portion of the sidewalk.

20 Claims, 14 Drawing Sheets

FOREIGN PATENT DOCUMENTS

| | | |
|---|---|---|
| KR | 19910008237 A | 5/1991 |
| KR | 20020067299 A | 8/2002 |

OTHER PUBLICATIONS

English Abstract for KR20020067299; Publication date: Aug. 22, 2002; 1 page.

English Abstract for JP2002129761; Publication date: May 9, 2002; 1 page.

PCT International Search Report and Written Opinion for International Application No. PCT/US2008/082252; International Filing Date: Nov. 3, 2008; 10 pages.

* cited by examiner

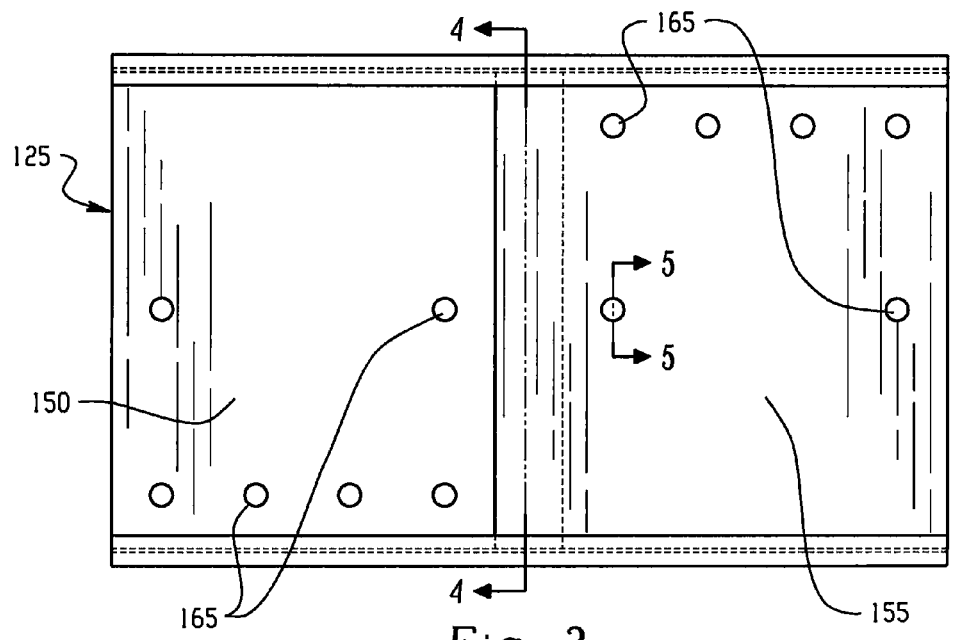
Fig. 3
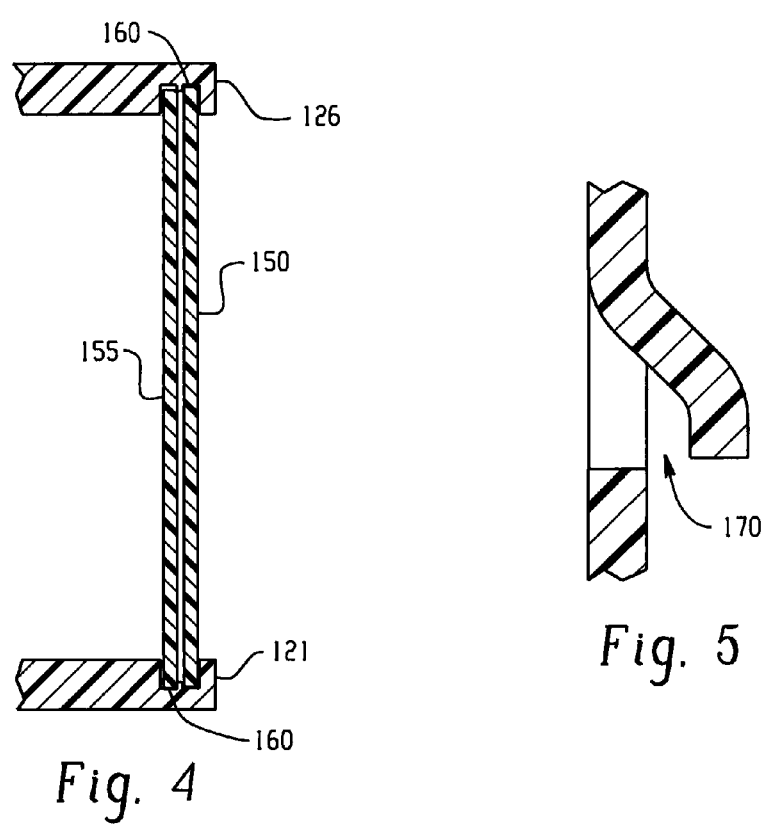
Fig. 4
Fig. 5

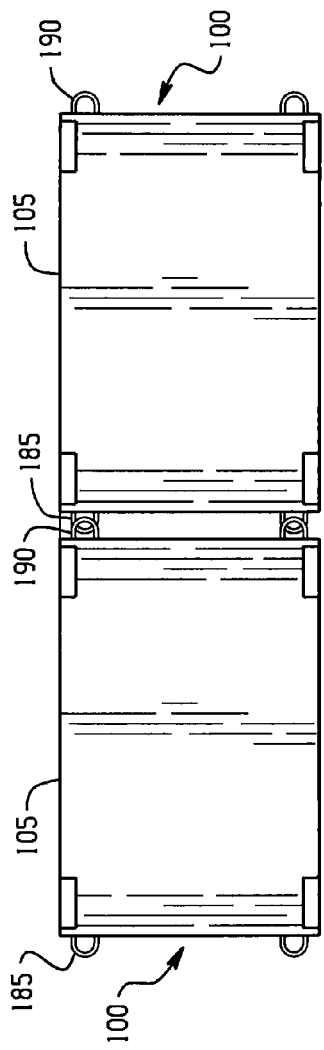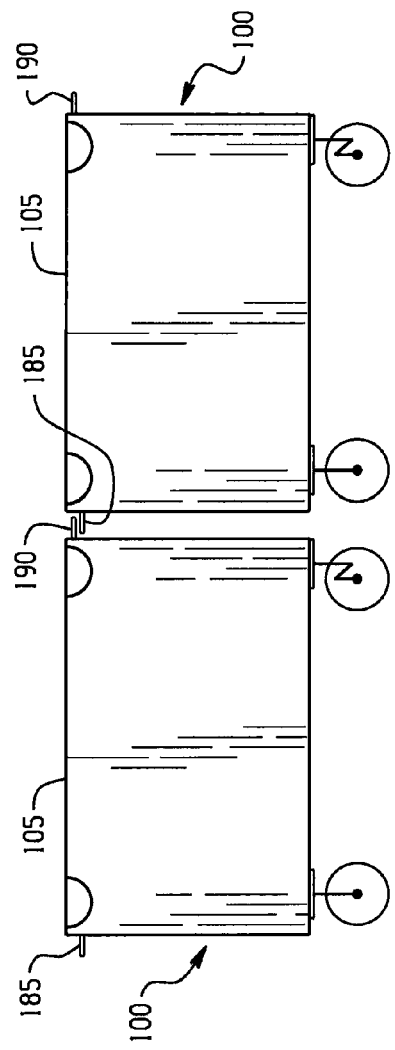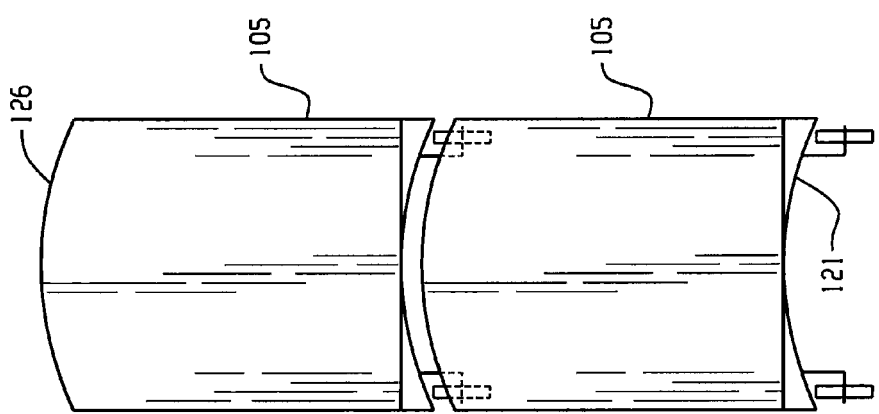

US 8,205,399 B2

PORTABLE DWELLING

CROSS REFERENCE TO RELATED APPLICATIONS

This application claims the benefit of U.S. Provisional Application Ser. No. 60/985,425, filed Nov. 5, 2007, which is incorporated herein by reference in its entirety.

BACKGROUND OF THE INVENTION

The present disclosure relates generally to a portable dwelling, particularly to a portable dwelling for a homeless person, and more particularly to a portable dwelling that can be used to establish a community for homeless people.

Homeless people are not defined by their gender, race, national origin, or location on earth, they are just like everyone else, they are everywhere, but they do not have a home. We have all seen them on city streets and even in small towns. People who have lost not just their homes, but their entire way of life. We see them shuffling along with their shopping carts and plastic bags, looking for a cool place to sit down in summer and for a warm place to sleep in winter. We can't see a way to give them all homes, especially as their numbers keep growing. And so we look away. We walk past them, a little afraid to make eye contact in case they ask us for something.

On any given night in the United States, it is reported that 750,000 people are homeless. And during the course of a year, as many as 3 million people are reported to experience homelessness at some point. Some of the homeless look for permanent housing and the services that will enable them to live somewhere other than on the streets, while other homeless just care about getting through one day to the next.

While existing programs and shelters for the homeless provide some degree of comfort and relief, there remains a need for a program that can continue to grow and evolve as the needs of our world's homeless change, that can provide a way to help the homeless today, that can provide some relief to our neediest citizens, and that can provide respite for our world's homeless people until a better solution comes along. It's the least we can do.

BRIEF DESCRIPTION OF THE INVENTION

An embodiment of the invention includes a portable dwelling for use on the ground. The dwelling includes an enclosure having an interior space so dimensioned to receive an adult human being in a reclined or laying position and in an upright sitting position within the interior space. The enclosure has a frame defined by a plurality of rigid panel surfaces between the interior space and an exterior space capable of maintaining dryness of the interior space in the event of a rainfall in the exterior space. Wheels are attached to the enclosure to facilitate movement of the enclosure along the ground. The enclosure has a mass capable of being moved along the ground via the wheels by only one adult human being, and has an exterior profile so dimensioned to allow the enclosure to be moved along a sidewalk of a city without completely obstructing a navigable portion of the sidewalk.

Another embodiment of the invention includes an arrangement of the aforementioned dwellings. The arrangement includes a plurality of the dwellings coupled together in a communal manner that defines both personal space and community space. The personal space for an individual person includes the interior space of that person's dwelling. The community space includes exterior space having a boundary defined by a perimeter of the plurality of the dwellings.

BRIEF DESCRIPTION OF THE DRAWINGS

Referring now to the drawings, which are meant to be exemplary and not limiting, and wherein like elements are numbered alike in the accompanying Figures:

FIG. 3 depicts a front view a rear portion of the portable dwelling of FIG. 1;

FIG. 4 depicts a section view of the rear portion of FIG. 3;

FIG. 5 depicts a section view of a ventilation opening of the rear portion of FIG. 3;

FIG. 7 depicts an end view of an alternative stacking arrangement to that depicted in FIG. 6;

FIG. 8 depicts a top view to two portable dwellings of FIG. 1 coupled end to end;

FIG. 9 depicts a front view of the two portable dwellings of FIG. 8;

DETAILED DESCRIPTION OF THE INVENTION

An embodiment of the invention, as shown and described by the various figures and accompanying text, provides a portable dwelling for a homeless person that can be coupled with one or more other dwellings to establish a community for the homeless, thereby providing a sense of community and belonging to those who are all too familiar with isolation.

The dwelling disclosed herein is also referred to as a portable home that can be maneuvered like a cart.

Though the primary goal of the portable home is to provide homeless people with shelter from the weather and a degree of privacy from the world, a secondary goal is to provide them some mental stimulation and some sense of personal identity again. As such, each dwelling may also be provided with a small 4-inch×6-inch document holder located on an outside surface of the dwelling, which could be used to personalize the dwelling.

Upon distribution of an exemplary dwelling to a homeless person, a photograph of that person, if they are so willing, could be taken and his or her name printed on a card, which could then be tucked into the document holder and sealed with tape. This would be a visible symbol that the person now owns that dwelling. It would also help officials locate and identify persons when needed. This service would be optional since some homeless people will not want to be identified.

Other amenities for use with the dwelling may also be provided, such as a solar flashlight, a lightweight insulated blanket, a gel mattress and pillow with covers, some mesh bags for storing personal items, toiletries, especially travel size, small bags, nail clippers, emory boards, sanitary supplies, personal wipes, plastic containers, plastic sealable bags, pre-packaged portable food packs, such as freeze-dried foods, nuts and dried fruits, plastic utensils, magazines, paperback books, and children's toys and books, to name a few.

In an embodiment, a plurality of dwellings may be joined side-by-side and stacked no more than two high to allow families to a share a common living space.

Figure 1:
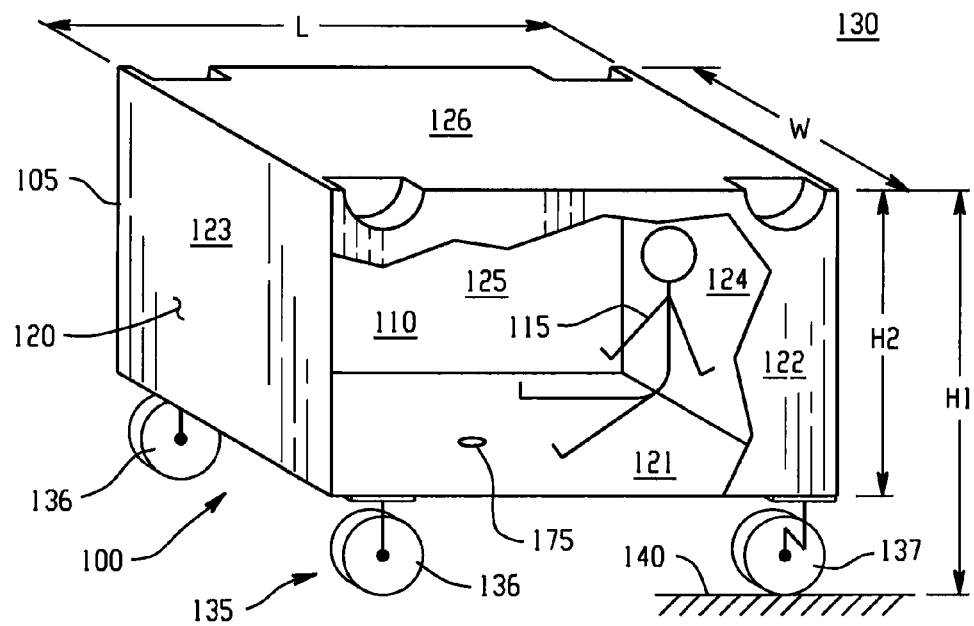
FIG. 1 depicts a front isometric view of an exemplary portable dwelling in accordance with an embodiment of the invention.

With reference now to FIG. 1, an exemplary embodiment of the dwelling 100 is disclosed having an enclosure 105 defining an interior space 110 so dimensioned to receive an adult human being 115 (stick figure representation) in a reclined or laying position and in an upright sitting position (FIG. 1 illustrating the sitting position) within the interior space 110. The enclosure 105 includes a frame defined by a plurality of rigid panel surfaces 120 (having individual reference numerals 121-126, discussed further below) between the interior space 110 and an exterior space 130 capable of maintaining dryness of the interior space in the event of a rainfall in the exterior space. As used herein, rigid panel surfaces means rigid panels, as opposed to pipes or tubes covered by flexible fabric, that provide structural surfaces having overall dimensions of respective lengths, widths, and heights, of enclosure 105, and being structurally suitable for stacking one dwelling on top of another. A plurality of wheels 135 are attached to the enclosure 105 to facilitate movement of the enclosure 105 along the ground 140. For maneuverability, one set of wheels 136 are fixed wheels (non-swiveling), and another set of wheels 137 are swivel wheels. In an embodiment, both sets of wheels are lockable.

In an embodiment, an outside length L of the enclosure 105 is 5-feet (1.52 meters), an outside width W of the enclosure 105 is 2.5-feet (0.76 meters), a height H1 of the enclosure 105 with wheels 135 is 4-feet (1.22 meters), and a height H2 without wheels 135 is 3-feet (0.91 meters). However, it will be appreciated that such dimensions are exemplary only and are not intended to be limiting in any way. For example, the enclosure 105 has an exterior profile so dimensioned to allow the enclosure to be moved along a sidewalk of a city without completely obstructing a navigable portion of the sidewalk. As such, the dimensions of the enclosure 105 are not dictated solely by the exemplary dimensions provided herein. In addition, the enclosure has a mass capable of being moved along the ground 140 via the plurality of wheels 135 by the single adult human being 115. In an embodiment, enclosure 105 has a weight of about 60 pounds (about 27.2 kilograms).

As illustrated, the portable dwelling 100 includes a floor portion 121, a plurality of wall portions 122, 123, 124, 125 removably connected to the floor portion 121, and a roof portion 126 disposed above and removably connected to the plurality of wall portions 122, 123, 124, 125. The plurality of surfaces 121-126 may be molded structures fabricated from an engineering plastic such as polyester glass thermoplastic for example, from any other moldable material suitable for the intended purpose disclosed herein such as fiber reinforced or unreinforced thermoset plastic for example, or may be made from any other material suitable for the intended purpose disclosed herein, such as fiberglass panels for example. The plurality of wall portions include a front portion 122, a first side portion 123, a second side portion 124, and a rear portion 125, wherein the front portion 122 is movable to provide ingress and egress by the adult human being with respect to the interior space 110. In addition, the rear portion 125 is movable to allow ingress and egress by the adult human being with respect to the interior space 110. In an embodiment, the plurality of surfaces 121-126, also herein referred to as panels, are made from an engineering plastic, such glass reinforced polyester for example.

Figure 2:
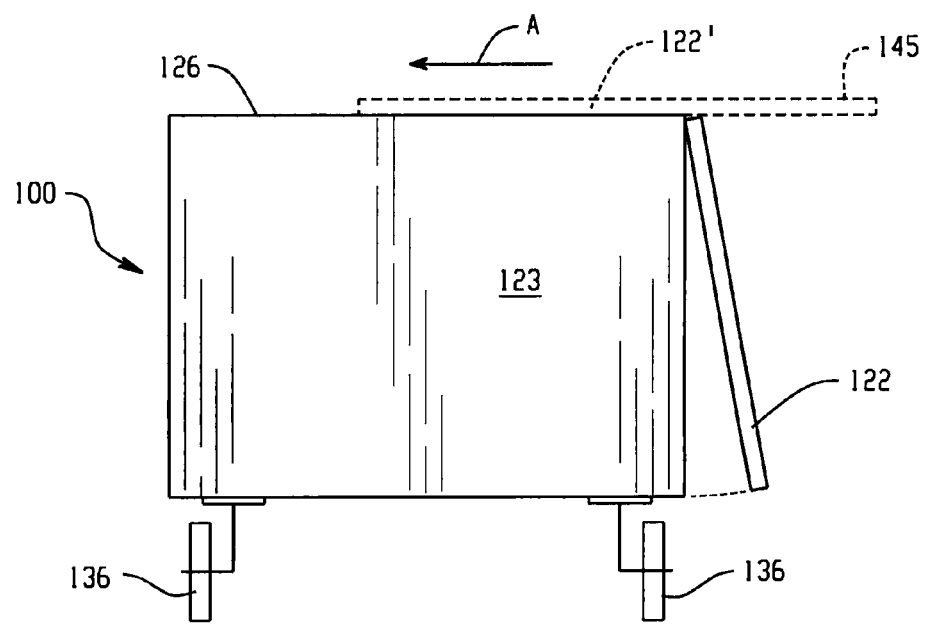
FIG. 2 depicts an end view of the portable dwelling of FIG. 1.

Referring to FIG. 2, the front portion 122 is movable from a vertical plane (as illustrated via the orientation of enclosure 105 in FIG. 2) to a horizontal plane (as illustrated by reference numeral 122' in FIG. 2) proximate the roof portion 126, and in response to being oriented in the horizontal plane, is capable of being translated in the horizontal plane in a direction "A" to further cover either the roof portion 126 or the interior space at least partially. That is, an end portion 145 of the front portion 122 is permitted to overhang the enclosure 105, thereby providing a type of soffit to protect the interior space 110 of dwelling 100 from weather elements when open. It will be appreciated that when two dwellings are disposed adjacent each other, which will be discussed further below, with the rear edge of the roof portion of the frontward dwelling being disposed adjacent a front edge of the roof portion of the rearward dwelling, thereby defining a roof seam, the soffit of the rearward dwelling will extend across the roof seam, thereby providing further protection of the interior space of the two interlocked dwellings against weather elements. In an embodiment, the front portion 122 opens in a manner similar to a single-panel garage door having a pin or roller that follows a track, the pin/roller being a part of the front portion 122, and the track being a part of the sides 123, 124 or roof 126 portions, for example. In an embodiment, the pin/roller and track are integrally molded with the respective panels.

Referring to FIGS. 3 and 4, the rear portion 125 includes a first panel 150 slidably movable in a vertical plane with respect to a second panel 155, which may also be slidably movable in the vertical plane with respect to the first panel 150. Channels 160 in the floor portion 121 and the roof portion 126 facilitate the sliding action of panels 150, 155. Ventilation openings 165 in the panels 150, 155 provide for ventilation to the interior space 110. An alternate arrangement for ventilation openings 170 is depicted in FIG. 5. Ventilation openings 165, 170 may be circular or elongated slots, and may be disposed on any of the surfaces of wall portions 122, 123, 124, 125. Floor portion 121 may include a drain opening 175 (best seen by referring back to FIG. 1) to allow for the interior to be easily cleaned and the cleaning solutions washed out of the drain.

Figure 6:
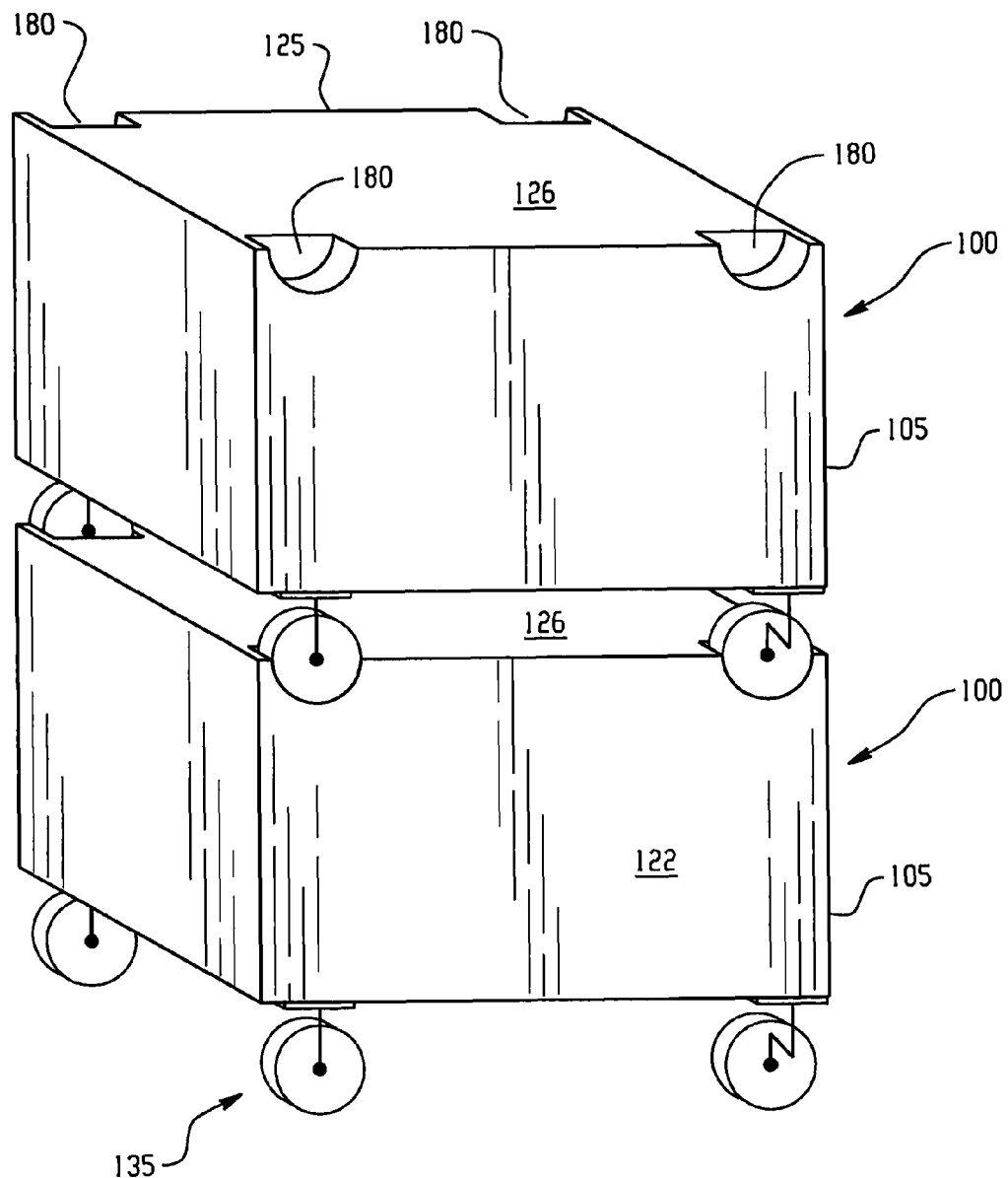
FIG. 6 depicts a front isometric view of two portable dwellings of FIG. 1 stacked in accordance with an embodiment of the invention.

Referring to FIGS. 6 and 7, each portable dwelling 100 includes means for stacking one dwelling on top of an other, such as recesses 180 in the front portion 122, rear portion 125 and/or roof portion 126, configured and dimensioned to receive the wheels 135, which are preferably locked. As seen in FIG. 7, an embodiment of enclosure 105 is configured with the floor portion 121 and the roof portion 126 having matching curved profiles, which facilitates water runoff in a rainfall. The close fit between wheels 135 and recesses 180 provide a sturdy means, with the wheels locked, for interlocking one dwelling on top of the other so as to deter horizontal movement of the stacked one dwelling with respect to the other dwelling.

Referring to FIGS. 8 and 9, each enclosure 105 includes means, such as loops (coupling rings) 185, 190, for interlocking one dwelling with an other disposed endwise adjacent thereto so as to limit movement of the interlocked one dwelling with respect to the other dwelling. Loops 185 and 190 are vertically offset with respect to each other to facilitate an over-under engagement of the loops, which also serves to have all dwellings having their front portion facing the same direction when coupled end-to-end.

Figure 10:
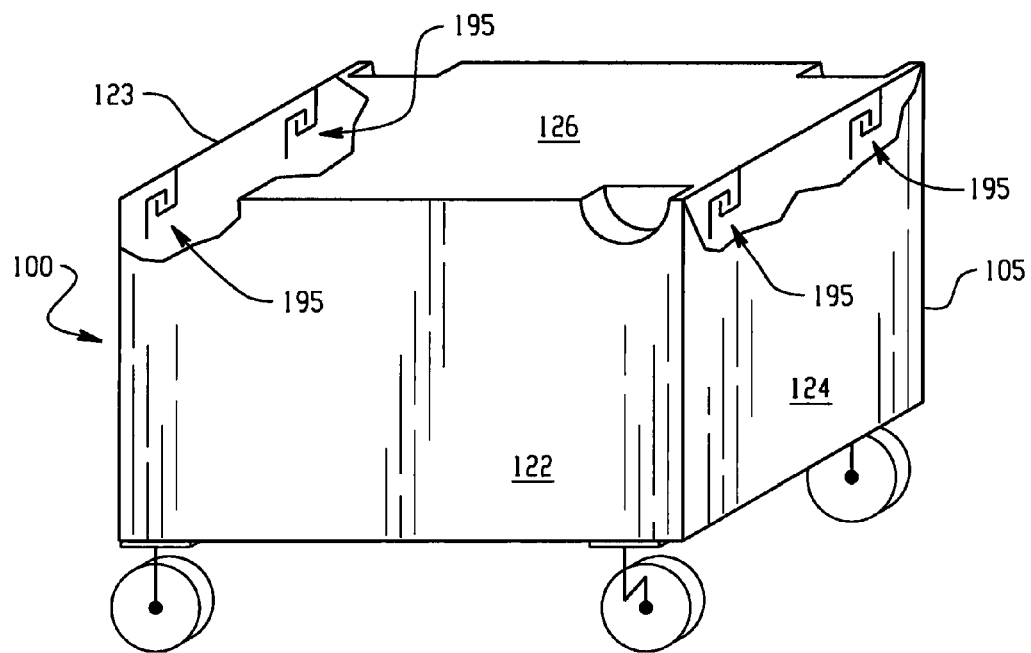
FIG. 10 depicts a front isometric cutaway view of the portable dwelling of FIG. 1 showing exemplary compression clamps in accordance with an embodiment of the invention.
Figure 11:
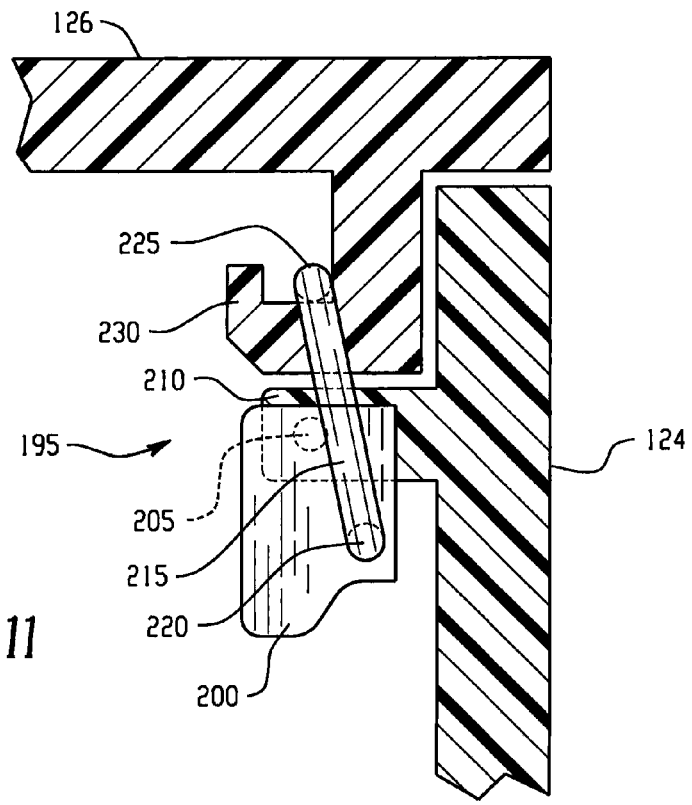
FIG. 11 depicts a partial section view of the compression clamp of FIG. 10.

Referring to FIGS. 10 and 11, the roof portion 126 is securely fastenable and unfastenable to the plurality of wall portions, and particularly the end wall portions 123, 124, via compression clamps 195 disposed within the interior space 110, thereby allowing emergency egress from the interior space by quick removal of the roof portion 126. FIG. 10 illustrates the compression clamps 195 generally, along with an exemplary arrangement, and FIG. 11 illustrates a more detailed aspect of the compression clamps 195. With reference now to FIG. 11, an exemplary compression clamp 195 is seen to have a handle 200 with a pivot 205 that is pivotally secured to a standoff 210 of end wall portion 124. A locking link 215 is pivotally attached to handle 200 at pivot 220, and has a free looped end 225 that engages with hook 230, which is part of roof portion 126. By virtue of the overcentering action of locking link 215 relative to pivot 205 as handle 200 is pivoted into the locked position, as illustrated in FIG. 11, the roof portion 126 is securely fastened to, but unfastenable from, the plurality of wall portions of enclosure 105. Similar compression clamps, or other suitable means, located on the plurality of surfaces 120 within the enclosure 105 may be used to secure the enclosure from within the enclosure, and especially to secure the front portion 122 when closed.

Figure 12:
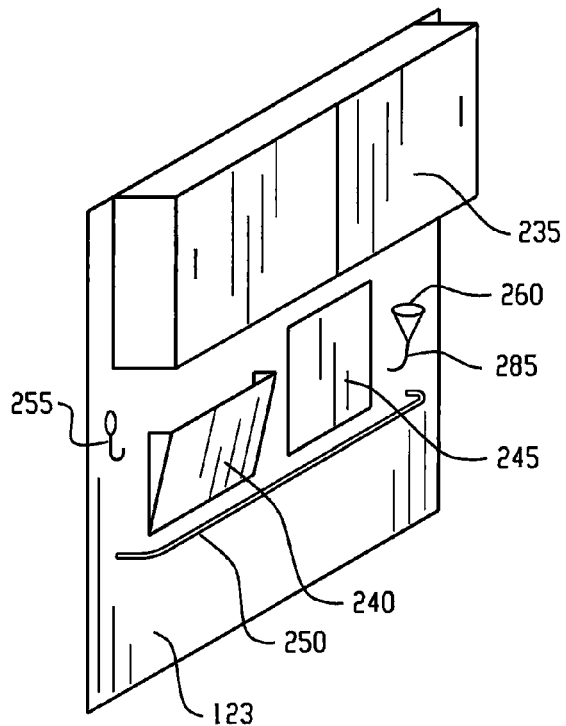
FIG. 12 depicts an interior surface of a left side portion of the portable dwelling of FIG. 1.
Figure 13:
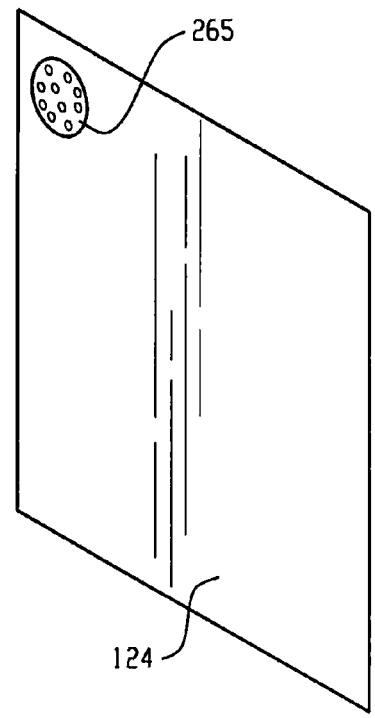
FIG. 13 depicts an interior surface of a right side portion of the portable dwelling of FIG. 1.
Figure 14:
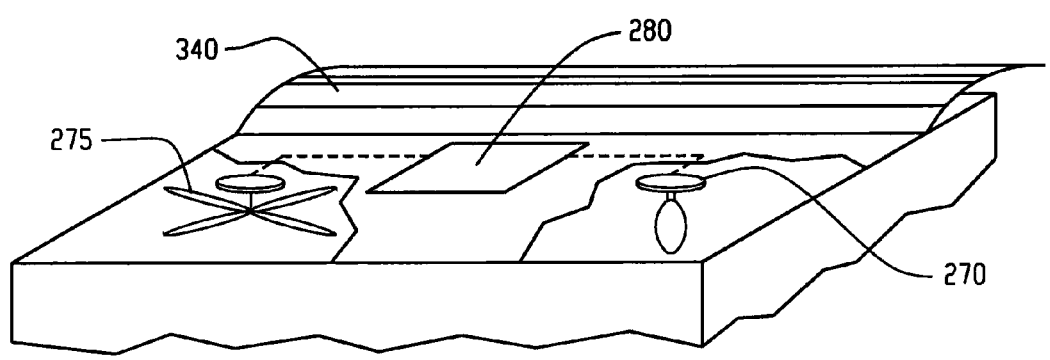
FIG. 14 depicts an interior cutaway view of a roof portion of the portable dwelling of FIG. 1.

Referring to FIGS. 12-14, at least one of the plurality of wall portions 122, 123, 124, 125, such as wall portion 123 or 124 as illustrated in FIGS. 12 and 13 for example, may include one or more of a storage cabinet 235, a magazine holder 240, a document holder 245, a utility bar 250, a utility hook 255, a cup holder 260, a shower nozzle 265, a light fixture 270, and a fan fixture 275, with the electrical fixtures 270, 275 being powered by a solar panel 280. In an embodiment, the cup holder 260 includes a fluid drain 285 directed external of the interior space 110 to address any spillage in cup holder 260. In an embodiment, the shower nozzle 265 is connected to a fitting through the side wall portion 124 that allows a water supply to be connected.

Figure 15:
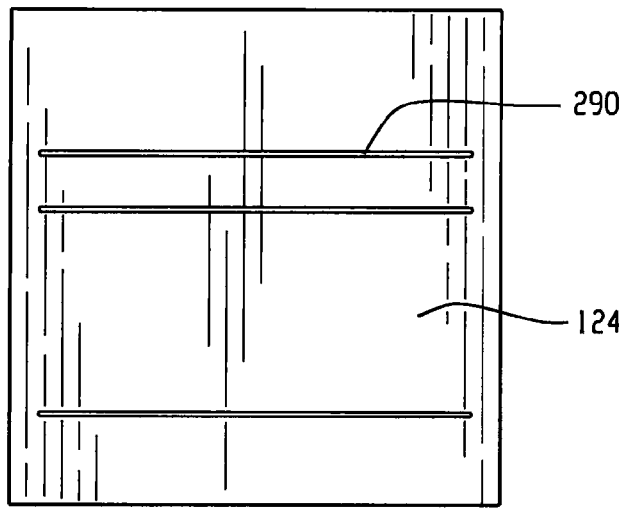
FIG. 15 depicts an outside end view of a side portion of the dwelling showing handles attached thereto.
Figure 16:
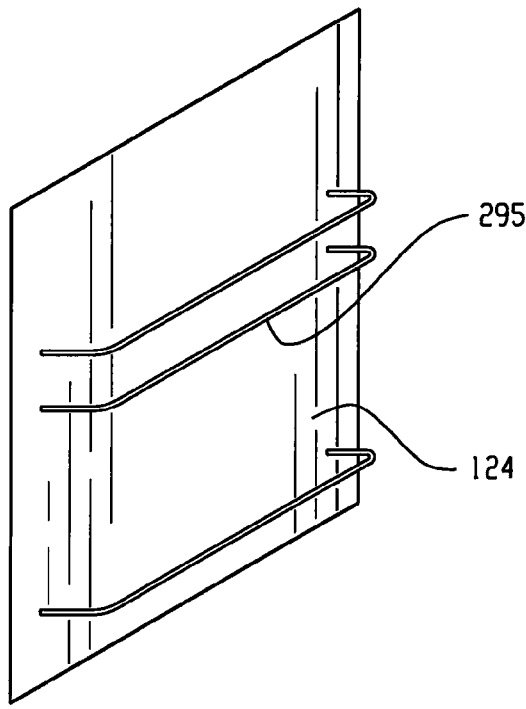
FIG. 16 depicts an outside isometric view of the side portion of FIG. 15 with alternative handles attached thereto.
Figure 17:
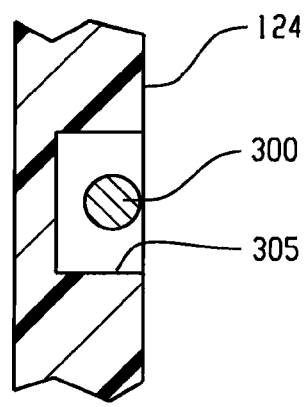
FIG. 17 depicts a partial section view of an alternative handle to those depicted in FIGS. 15 and 16.

Referring to FIGS. 15-17, an embodiment of the enclosure 105 includes at least one exterior handle 290 to facilitate movement of the enclosure along the ground via the plurality of wheels by the single adult human being, and to facilitate lifting of the enclosure when stacking one on top of an other. The handles may protrude outboard of the enclosure, as depicted by handle 295 in FIG. 16, or may be a handle 300 recessed within a pocket 305 relative to a surface defined by outside wall portion 124, which defines an outside dimension of the enclosure 105. In either embodiment of FIGS. 15-17, handles 290, 295, 300 may be molded integral with molded wall portion 124.

Figure 18:
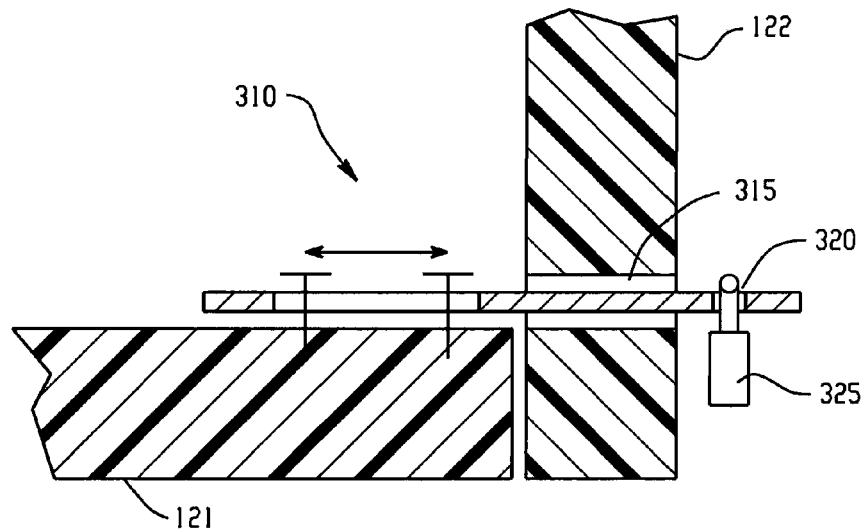
FIG. 18 depicts a partial section view of a latch mechanism in accordance with an embodiment of the invention.

Referring to FIG. 18, the exterior of the enclosure 105 may be secured by a sliding latch 310 slidably secured to the interior surface of the floor portion 121, the sliding latch being extendable and retractable through an opening 315 at the bottom of the front portion 122, the sliding latch having a loop or hole 320 for receiving a lock 325 therethrough.

Figure 19:
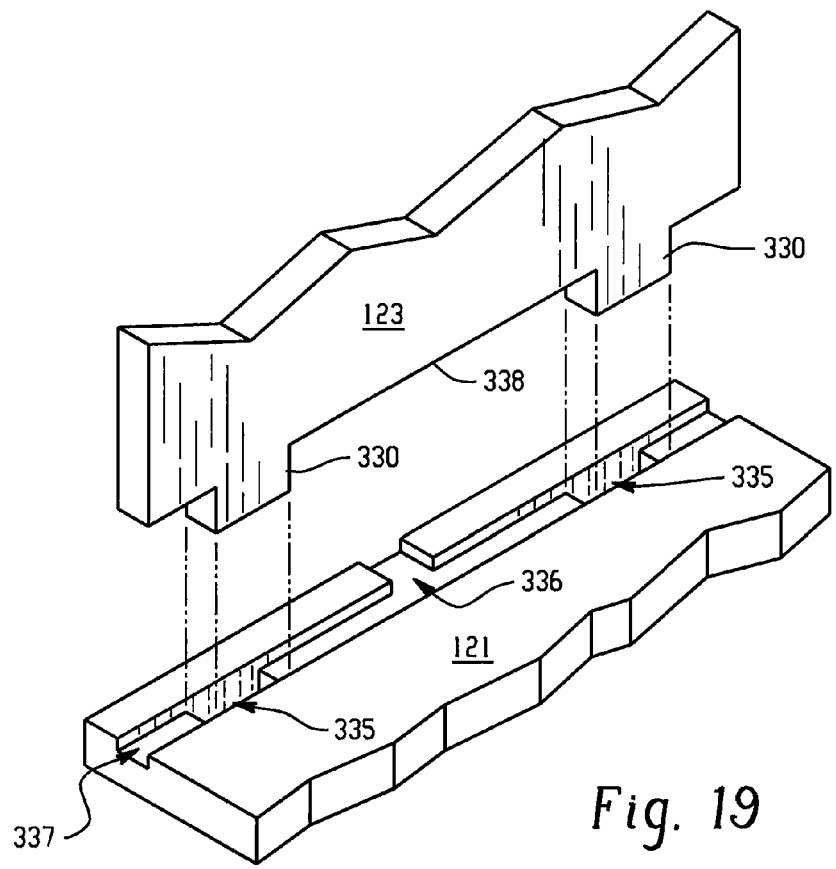
FIG. 19 depicts a partial isometric view of portions of the portable dwelling showing a knock down construction.

Referring to FIG. 19, the plurality of wall portions, represented by wall portion 123, of enclosure 105 are connectable via a knock down interlocking means, such as the peg 330 and hole 335 arrangement illustrated, or other such suitable means. To prevent rain water or other weather elements from working their way into the interior space 110 through a wall portion, an embodiment includes drainage troughs 336 and channels 337 formed in the floor portion 121, where the bottom edge 338 of a respective wall portion plugs into a respective trough 336 of the floor portion 121. While a weather-proofing arrangement of only one wall portion 123 relative to floor portion 121 is illustrated in FIG. 19, it will be appreciated that the same teaching can be applied to any of the wall portions disclosed herein.

Figure 20:
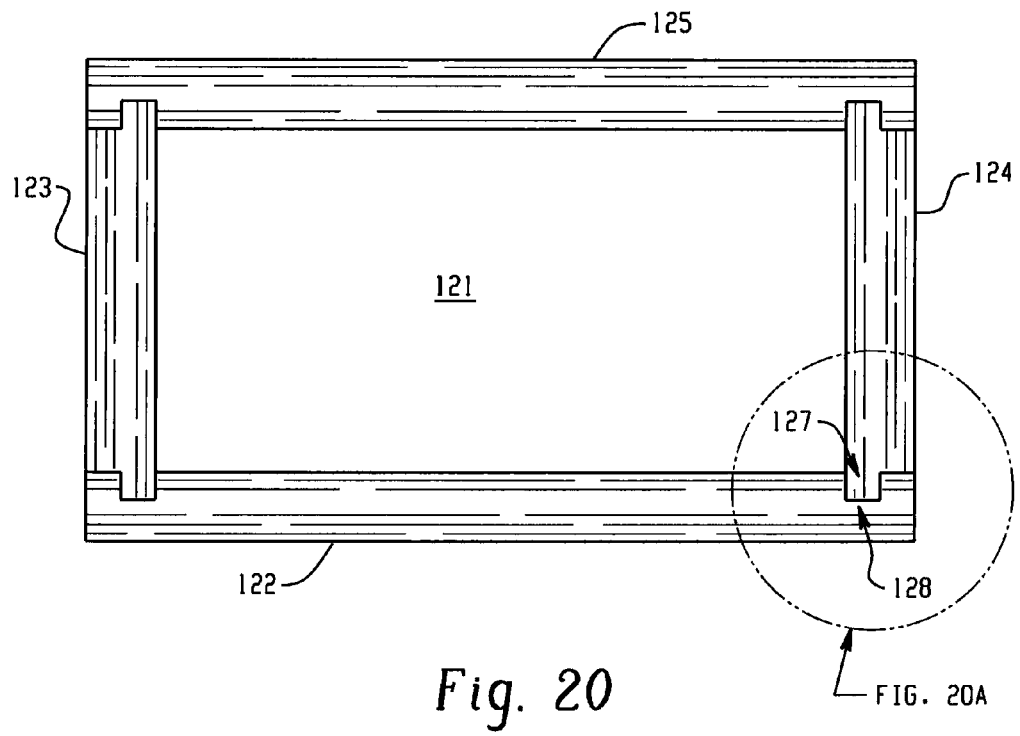
FIG. 20 depicts a top plan view of floor and wall portions of the portable dwelling of FIG. 1 with a roof portion removed, and an expanded view of a corner region thereof.
Figure 20A:
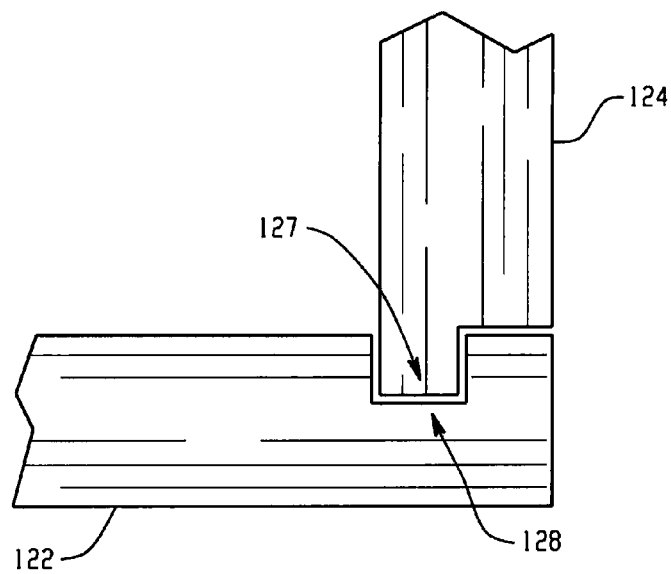

Another weather-proofing arrangement at the outer corners of enclosure 105 is illustrated in FIG. 20, which depicts a top plan view of wall portions 122, 123, 124, 125 with roof portion 126 removed. Here, each end of wall portions 123, 124 each include a projection 127 (represented in the expanded view of FIG. 20 by projection 127 of one end of wall portion 124), and each end of wall portions 122, 125 each include a pocket 128 (represented in the expanded view of FIG. 20 by pocket 128 of one end of wall portion 122), where a respective projection 127 engages with an associated pocket 128 to provide a weather-proof arrangement thereat. While FIGS. 19 and 20 depict specific arrangements of edges, troughs, projections and pockets, it will be appreciated that such specificity is for illustration purposes only, and that the scope of the invention encompasses other arrangements and geometries suitable for the purposes disclosed herein, such as dovetail projections and pockets for example.

Figure 21:
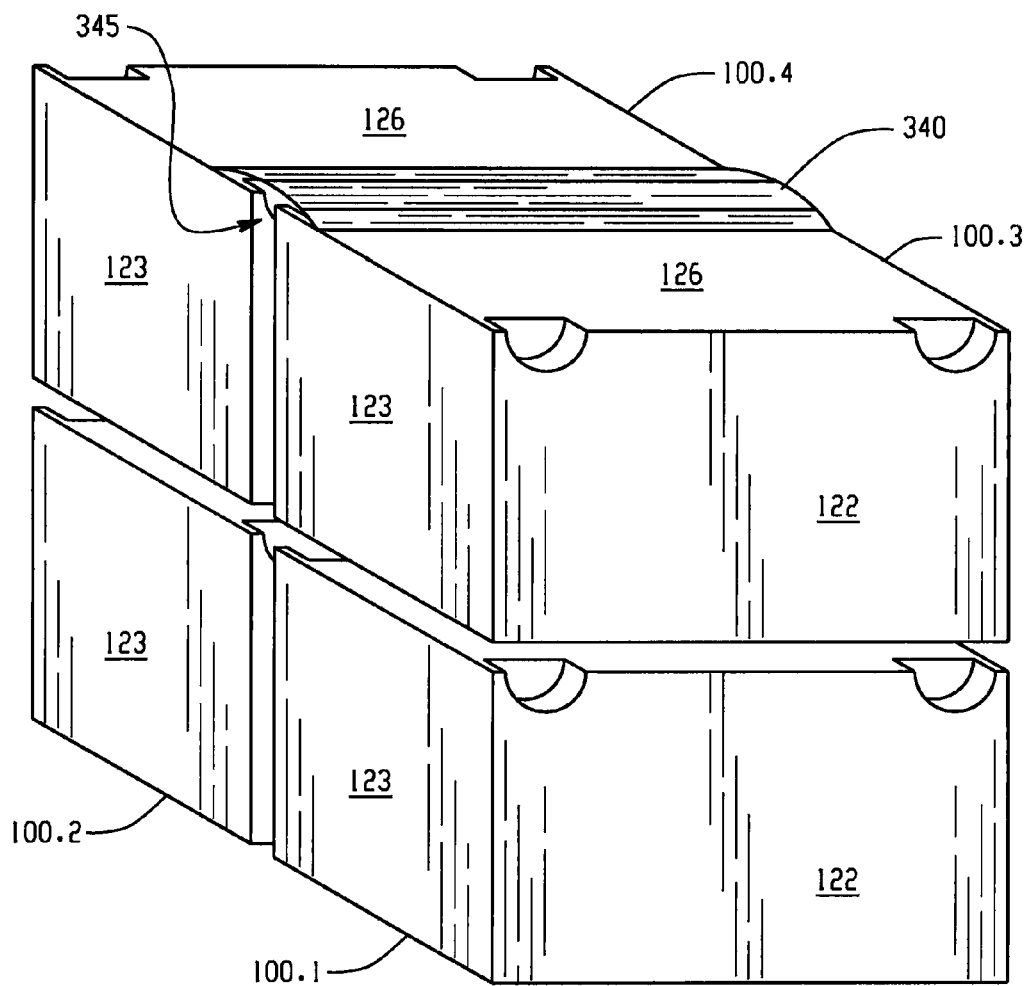
FIG. 21 depicts a quad arrangement of the portable dwellings of FIG. 1 showing a screen portion over two adjacent roof portions.

Referring to FIG. 21, a first dwelling 100.1 may be disposed adjacent to and interlocked with a second dwelling 100.2 such that the front opening (front portion 122 in the open position) of the second dwelling 100.2 being disposed adjacent the rear portion 125 of the first dwelling 100.1, the rear portion 125 of the first dwelling 100.1 remaining capable of being opened and closed thereby allowing the interior space 110 of the first dwelling 100.1 to flow into the interior space 110 of the second dwelling 100.2. A third dwelling 100.3 may be similarly disposed with respect to a fourth dwelling, but stacked on top of the first 100.1 and second 100.2 dwellings as illustrated.

Referring briefly back to FIG. 14 in combination with FIG. 21, a removable screen portion 340 may be disposed on the roof portions 126 of the first and the second dwellings if not stacked, or on the roof portions 126 of the third and forth dwellings if stacked and as illustrated in FIG. 21, across the roof seam 345 defined by the front edge of one roof portion and the rear edge of an adjacent roof portion, thereby providing further protection of the interior space of the interlocked dwellings against weather elements.

While certain geometries have been discussed herein with respect to certain parts of dwelling 100, it will be appreciated that these certain geometries are for illustration purposes only and that other geometries for those certain parts may be employed where those other geometries remain suitable for the purposes disclosed herein. For example, enclosure 105 is described and illustrated as having a frame defined by a plurality of rigid planar panel surfaces 120, more specifically wall portions 122, 123, 124, 125, that are rectangular in shape and form vertical walls extending between floor portion 121 and roof portion 126. However, an alternative embodiment may employ wall portions of any shape while remaining suitable for the purposes disclosed herein, such as trapezoidal shaped panels that provide for inwardly or outwardly angled wall portions, or bubble shaped panels that provide for outwardly bulging wall portions for example. In an embodiment employing a wall portion alternative to a vertically oriented wall portion, a weather-flange integrally formed on appropriate edges of a respective wall portion may be employed so as to shield the interior of the dwelling from weather elements. As a further example, wall portion 122 is described and illustrated herein as defining a single-panel garage door that can be opened and closed. However, an alternative embodiment may employ a wall portion 122 similar to wall portions 123, 124, but with a side-hinged door and door opening formed therein, where the side-hinged door and door opening are constructed in a manner known in the art and placable in any convenient location (centrally located or toward one side for example) on wall portion 122. As yet a further example, roof portion 126 is described and illustrated being a flat panel. However, an alternative embodiment may employ a storage compartment integrally formed on the top thereof and accessible and lockable from the exterior space of the dwelling.

From the foregoing, it will be appreciated that a plurality of the dwellings 100 may be arranged and coupled together in a communal manner that defines both personal space and community space, the personal space for an individual person including the interior space of that person's dwelling, the community space including exterior space having a boundary defined by a perimeter of the plurality of dwellings.

Figure 22:
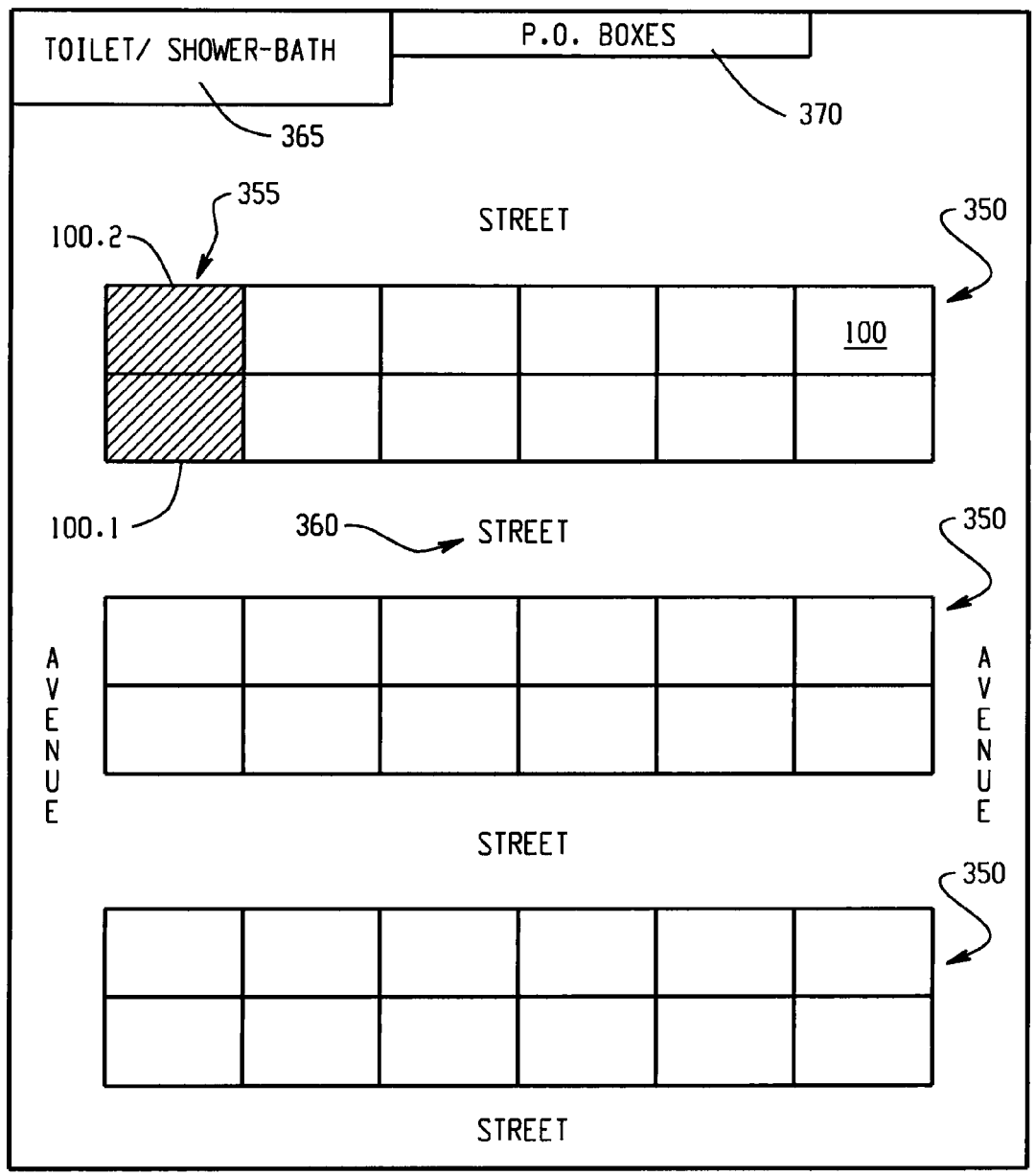
FIGS. 22-27 depict several plan views of communal arrangements of the dwellings of FIG. 1 in accordance with embodiments of the invention.

For example, and referring to FIG. 22, the plurality of the dwellings 100 may be arranged in a plurality of rows 350, each row comprising a plurality of pairs 355 of the dwellings 100, each pair having a first dwelling 100.1 disposed adjacent to and interlocked with a second dwelling 100.2, such that a rear side of the first dwelling is adjacent a front side of the second dwelling, each pair within each row being coupled with its neighboring pair. As illustrated, two of the plurality of rows are disposed parallel with each other and with a space therebetween, the space defining a street 360 and the community space. As also illustrated, a community plan may be established, which includes toilets and showers/baths 365, and post office boxes 370 that provide residents of the dwellings with a means for receiving mail.

Figure 23:
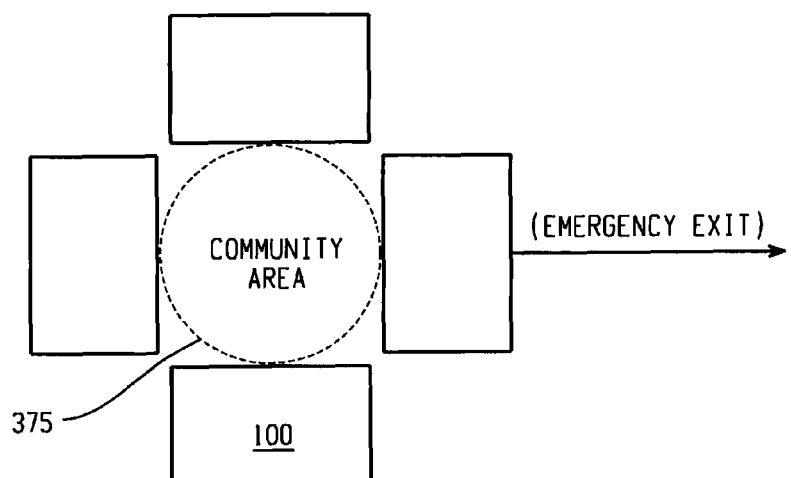
Figure 24:
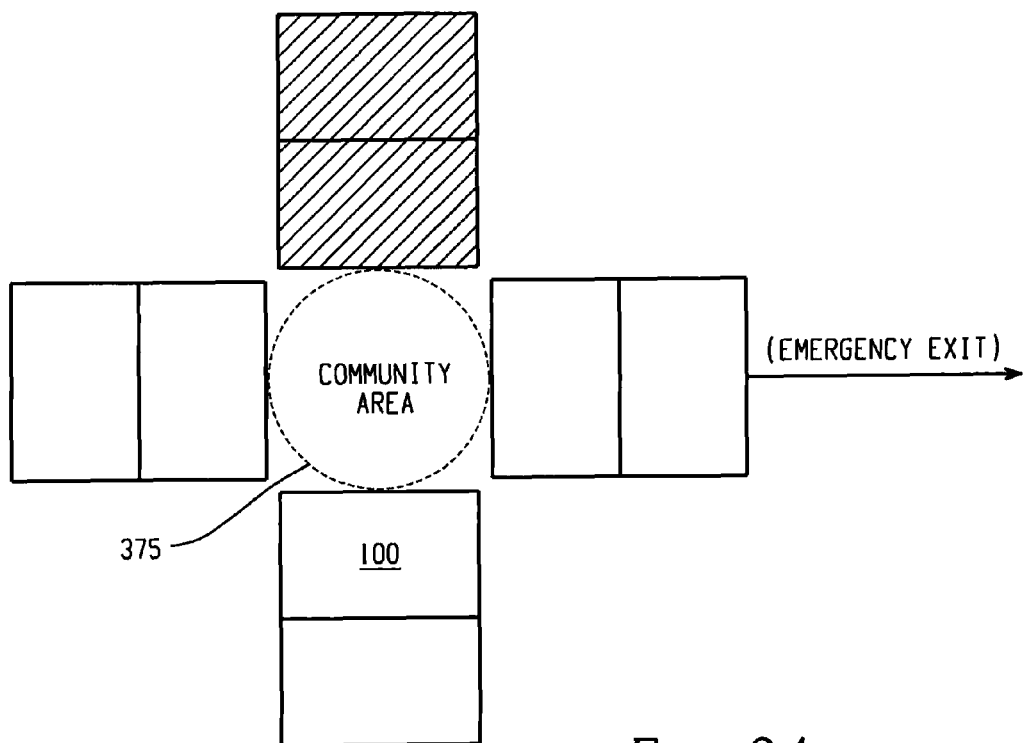
Figure 25:
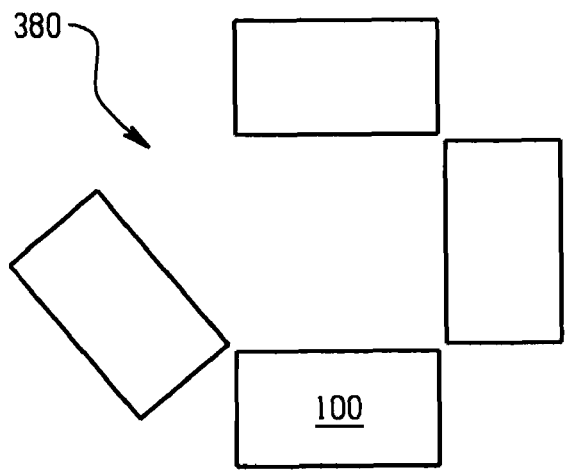
Figure 26:
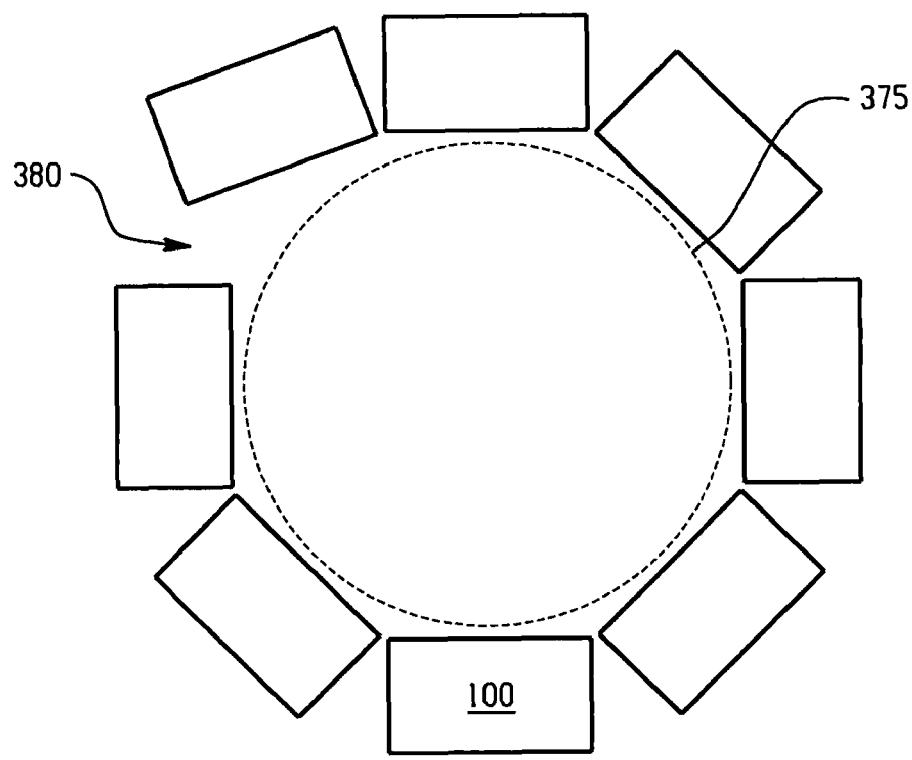
Figure 27:
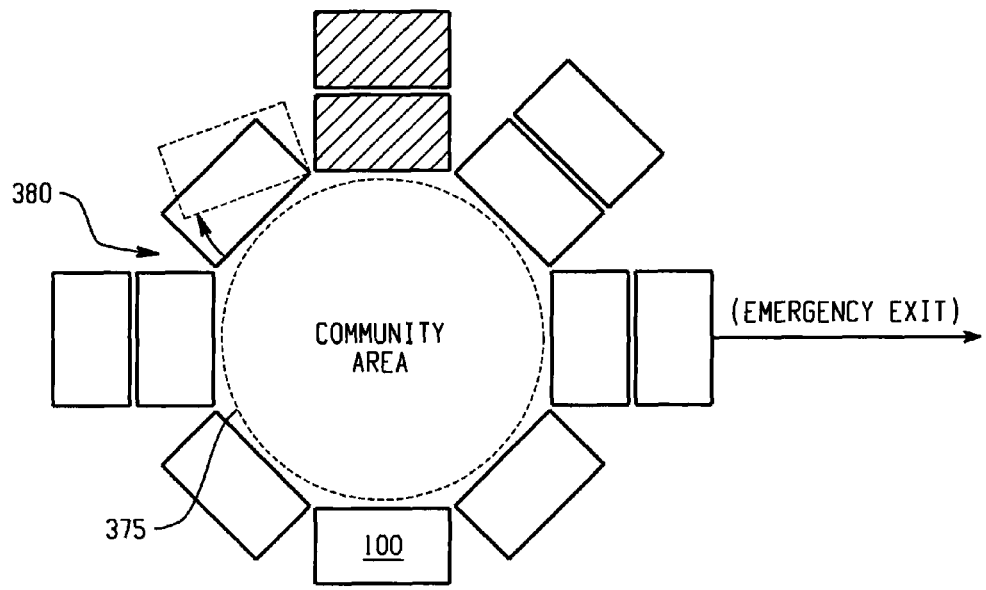

Referring to FIGS. 23-27, the plurality of the dwellings 100 may be arranged about a circle 375, each dwelling in the plurality being coupled with, but capable of being decoupled from, its neighboring dwelling, the enclosed circle defined by the coupled dwellings defining the community space. As illustrated in FIGS. 23 and 24, one of the dwellings could be used as an emergency exit. As illustrated in FIGS. 25 and 26, one or more of the dwellings 100 may be decoupled to provide access 380 to the community space, then recoupled as desired. When arranged about a circle, the community plan allows for a secure community space for young children to play in.

Figure 28:
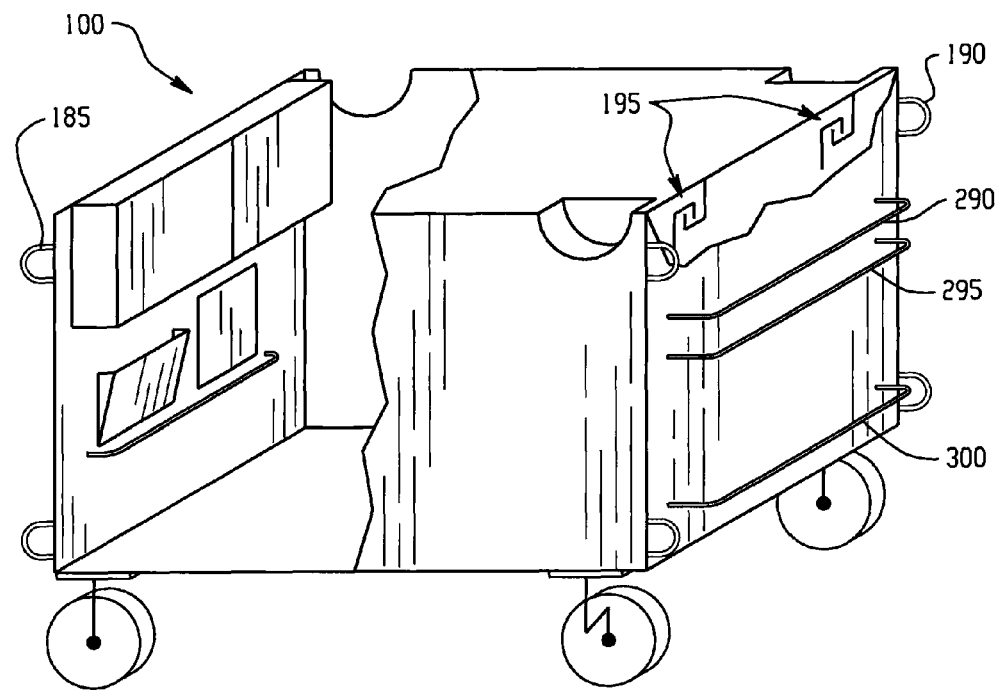
FIG. 28 depicts a cutaway isometric view of the portable dwelling of FIG. 1 with exemplary internal and external features added.

Referring to FIG. 28, a cutaway isometric view of the portable dwelling 100 is depicted with exemplary internal and external features added (compare with FIGS. 8-12 and 15-17 for example). Here, coupling rings 185, 190 are depicted having an orientation in a vertical plane versus a horizontal plane (as depicted in FIGS. 8 and 9), both orientations are contemplated herein.

While certain arrangements of dwellings 100 have been described and illustrated herein, it will be appreciated that these certain arrangements are for illustration purposes only and that any arrangement of dwellings 100 may be employed, such as a serpentine arrangement for example, in accordance with an embodiment of the invention. Any and all such arrangements are contemplated herein and are considered within the scope of the invention disclosed.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:
1. A portable dwelling for use on ground, comprising:
a rigid enclosure having an interior space so dimensioned to receive an adult human being in a reclined or laying position and in an upright sitting position within the interior space;
the enclosure comprising a frame defined by a plurality of rigid panel surfaces between the interior space and an exterior space capable of maintaining dryness of the interior space in the event of a rainfall in the exterior space;
a plurality of wheels attached to the enclosure that facilitate movement of the enclosure along the ground;
the enclosure having a mass capable of being moved along the ground via the plurality of wheels by only one adult human being; and
the enclosure having an exterior profile so dimensioned to allow the enclosure to be moved along a sidewalk of a city without completely obstructing a navigable portion of the sidewalk;
wherein the plurality of rigid panel surfaces comprises a floor portion and a plurality of wall portions, the plurality of wall portions being connectable to each other and being connectable to the floor portion via a knock-down interlock arrangement;
the floor portion comprises at least one of a drainage trough and a drainage channel disposed in an area where a bottom edge of a respective one of the plurality of wall portions engages with the floor portion; and
adjacent ones of the plurality of wall portions respectively include a mating projection and pocket arrangement to provide a weather-proof arrangement at outer corners of the enclosure.

2. The portable dwelling of claim 1, wherein the enclosure further comprises:
a floor portion;
a plurality of wall portions removably connected to the floor portion; and
a roof portion disposed above and removably connected to the plurality of wall portions.

3. The portable dwelling of claim 2, wherein:
the plurality of wall portions comprises a front portion, a first side portion, a second side portion, and a rear portion;
wherein at least one of the front portion and the rear portion is movable to provide ingress and egress by the adult human being with respect to the interior space.

4. The portable dwelling of claim 3, wherein:
the front portion is movable from a vertical plane to a horizontal plane proximate the roof portion, and in response to being oriented in the horizontal plane, is translatable in the horizontal plane in a direction to further cover either the roof portion or the interior space at least partially.

5. The portable dwelling of claim 3, wherein:
the rear portion comprises a first panel and a second panel each being disposed in a vertical plane, wherein at least one of the first panel and the second panel is slidably movable in the vertical plane with respect to the other of the first panel and the second panel.

6. The portable dwelling of claim 2, wherein:
at least one of the plurality of wall portions comprises a ventilation opening.

7. The portable dwelling of claim 2, wherein:
the roof portion is securely fastenable and unfastenable to at least one of the plurality of wall portions via compression clamps disposed within the interior space, thereby allowing emergency egress from the interior space via the roof portion.

8. The portable dwelling of claim 2, wherein:
at least one of the plurality of wall portions comprises at least one of a storage cabinet, a magazine holder, a document holder, a utility bar, a utility hook, a cup holder, a shower nozzle, a fan fixture, and a light fixture, accessible from the interior space.

9. The portable dwelling of claim 8, wherein:
the cup holder comprises a fluid drain extending from the interior space to the exterior space.

10. The portable dwelling of claim 1, further comprising:
means for stacking one portable dwelling on top of another, and for interlocking the stacked one with the other so as to deter horizontal movement of the stacked one with respect to the other; and
means for interlocking a first portable dwelling with an adjacently disposed second portable dwelling so as to limit movement of the interlocked first portable dwelling with respect to the adjacently disposed second portable dwelling.

11. The portable dwelling of claim 10, wherein:
the interlocking means comprises loops extending endwise but not sidewise off of the enclosure.

12. The portable dwelling of claim 1, wherein:
the enclosure comprises an exterior handle to facilitate movement of the enclosure along the ground via the plurality of wheels by the only one adult human being, wherein the exterior handle is recessed within a pocket relative to a surface defined by an outside dimension of the enclosure.

13. The portable dwelling of claim 1, wherein:
the plurality of surfaces of the enclosure comprise at least one of: means for securing the enclosure from within the enclosure; and, means for securing the enclosure from outside the enclosure.

14. The portable dwelling of claim 1, wherein:
the enclosure has an outside length of about 5 feet, an outside width of about 2.5 feet, a first height including the plurality of wheels of about 4 feet, a second height excluding the plurality of wheels of about 3 feet, and a weight of about 60 pounds.

15. A plurality of portable dwellings for use on ground, each of the plurality of portable dwellings comprising:
a rigid enclosure having an interior space so dimensioned to receive an adult human being in a reclined or laying position and in an upright sitting position within the interior space;
the enclosure comprising a frame defined by a plurality of rigid panel surfaces between the interior space and an exterior space capable of maintaining dryness of the interior space in the event of a rainfall in the exterior space;
a plurality of wheels attached to the enclosure that facilitate movement of the enclosure along the ground;
the enclosure having a mass capable of being moved along the ground via the plurality of wheels by only one adult human being; and
the enclosure having an exterior profile so dimensioned to allow the enclosure to be moved along a sidewalk of a city without completely obstructing a navigable portion of the sidewalk;
each of the plurality of portable dwellings comprising a front wall portion capable of being opened and closed, and a rear wall portion capable of being opened and closed, an opened front wall portion defining a front opening, and an opened rear wall portion defining a rear opening, wherein:
a first of the plurality of portable dwellings is disposed adjacent to and interlocked with a second of the plurality of portable dwellings such that the front opening of the second dwelling is disposed adjacent the rear wall portion of the first dwelling, the rear wall portion of the first dwelling remaining capable of being opened and closed thereby allowing the interior space of the first dwelling to flow into the interior space of the second dwelling;
wherein the plurality of rigid panel surfaces comprises a floor portion and a plurality of wall portions, the plurality of wall portions being connectable to each other and being connectable to the floor portion via a knock-down interlock arrangement;
the floor portion comprises at least one of a drainage trough and a drainage channel disposed in an area where a bottom edge of a respective one of the plurality of wall portions engages with the floor portion; and
adjacent ones of the plurality of wall portions respectively include a mating projection and pocket arrangement to provide a weather-proof arrangement at outer corners of the enclosure.

16. The plurality of portable dwellings of claim 15, wherein each of the dwellings comprises a roof portion, a rear edge of the roof portion of the first dwelling being disposed adjacent a front edge of the roof portion of the second dwelling thereby defining a roof seam, and further comprising:
a removable screen portion disposed on the roof portions of the first and the second dwelling across the roof seam thereby providing further protection of the interior space of the interlocked first and second dwellings against weather elements.

17. The plurality of portable dwellings of claim 15, wherein each of the dwellings comprises a roof portion, a rear edge of the roof portion of the first dwelling being disposed adjacent a front edge of the roof portion of the second dwelling thereby defining a roof seam, wherein:

the front wall portion of the second dwelling is disposed on the roof portions of the first and the second dwelling across the roof seam thereby providing further protection of the interior space of the interlocked first and second dwellings against weather elements.

18. An arrangement of portable dwellings, each portable dwelling comprising:

an enclosure having an interior space so dimensioned to receive an adult human being in a reclined or laying position and in an upright sitting position within the interior space;

the enclosure comprising a frame defined by a plurality of rigid panel surfaces between the interior space and an exterior space capable of maintaining dryness of the interior space in the event of a rainfall in the exterior space;

a plurality of wheels attached to the enclosure that facilitate movement of the enclosure along the ground;

the enclosure having a mass capable of being moved along the ground via the plurality of wheels by only one adult human being; and, the enclosure having an exterior profile so dimensioned to allow the enclosure to be moved along a sidewalk of a city without completely obstructing a navigable portion of the sidewalk, the arrangement comprising:

a plurality of the portable dwellings coupled together in a communal manner that defines both personal space and community space, the personal space for an individual person including the interior space of that respective person's dwelling, the community space including exterior space having a boundary defined by a perimeter of the plurality of the portable dwellings;

wherein the plurality of rigid panel surfaces comprises a floor portion and a plurality of wall portions, the plurality of wall portions being connectable to each other and being connectable to the floor portion via a knock-down interlock arrangement;

the floor portion comprises at least one of a drainage trough and a drainage channel disposed in an area where a bottom edge of a respective one of the plurality of wall portions engages with the floor portion; and adjacent ones of the plurality of wall portions respectively include a mating projection and pocket arrangement to provide a weather-proof arrangement at outer corners of the enclosure.

19. The arrangement of claim 18, wherein:

the plurality of the portable dwellings are arranged in a plurality of rows, each row comprising a plurality of pairs of the portable dwellings, each pair having a first dwelling disposed adjacent to and interlocked with a second dwelling, such that a rear side of the respective first dwelling is adjacent a front side of the respective second dwelling, each pair within each row being coupled with its neighboring pair; and two of the plurality of rows are disposed parallel with each other and with a space therebetween, the space defining a street and the community space.

20. The arrangement of claim 18, wherein:

the plurality of the portable dwellings are arranged about a circle, each dwelling in the plurality being coupled with, but capable of being decoupled from, its neighboring dwelling, the enclosed circle defined by the coupled dwellings defining the community space.

* * * * *